(12) United States Patent
Schnell

(10) Patent No.: US 7,075,631 B2
(45) Date of Patent: Jul. 11, 2006

(54) FIBEROPTIC FILLING LEVEL SENSOR FOR TRANSPARENT LIQUID MEDIA

(75) Inventor: Hans-Dietrich Schnell, Schenefeld (DE)

(73) Assignee: Autoflug GmbH & Co. (DE)

( * ) Notice: Subject to any disclaimer, the term of this patent is extended or adjusted under 35 U.S.C. 154(b) by 0 days.

(21) Appl. No.: 10/989,892

(22) Filed: Nov. 16, 2004

(65) Prior Publication Data

US 2005/0156123 A1    Jul. 21, 2005

(30) Foreign Application Priority Data

Nov. 19, 2003  (DE) .............................. 103 54 041

(51) Int. Cl.
*G01N 21/00*  (2006.01)

(52) U.S. Cl. ..................................................... 356/73.1

(58) Field of Classification Search .............. 356/73.1, 356/434; 250/227.21–227.25, 302, 900, 250/904, 907, 356.1; 73/293, 299, 302
See application file for complete search history.

(56) References Cited

U.S. PATENT DOCUMENTS 5,303,586 A * 4/1994 Zhao et al. .................... 73/293

FOREIGN PATENT DOCUMENTS

DE          3235591          3/2004

* cited by examiner

*Primary Examiner*—Tu T. Nguyen
(74) *Attorney, Agent, or Firm*—Robert W Becker & Associates; Robert W Becker

(57) ABSTRACT

A fiberoptic filling level determination apparatus for liquid transparent medium disposed in a container has a light wave conductor that is disposed within the container and has an input section that is connected to a light source and is guided in the container, in a helical path, to the deepest level of the container accessible for the filling level determination. Proceeding from the input section, the light wave conductor has a linear output section that is guided out of the container. Associated with the input section and the output section, externally of the container, is a respective device for measuring the intensity of introduced and exiting light. The ratio of the intensity measured by the devices can be represented in a filling level value.

12 Claims, 2 Drawing Sheets

FIBEROPTIC FILLING LEVEL SENSOR FOR TRANSPARENT LIQUID MEDIA

This U.S. application Ser. No. 10/989,892 should reflect the priority date of Nov. 19, 2003, the filing date of the corresponding German patent application 103 54 041.5.

BACKGROUND OF THE INVENTION

The invention relates to a fiberoptic filling level determination apparatus for liquid transparent media disposed in containers, with a light wave conductor that is at least partially immersible in the medium and is connected to a light source disposed externally of the container, whereby the difference in intensity between introduced light and exiting light is used to determine the filling level of the medium in the container.

A filling level determination apparatus of the aforementioned type is described in DE 32 35 591 C2; the known filling level determination apparatus comprises a light wave conductor that can be immersed in the container and that at its end that is immersible in the medium is ground at an angle or conically, and is polished. The light introduced into the light wave conductor via a light source is completely reflected at the appropriately split tip of the light wave conductor until the tip of the light wave conductor is submerged into the medium so that light then exits at the tip of the light wave conductor into the medium. By determining the difference in intensity between the introduced and the reflected light it is accordingly determined whether or not the tip of the light wave conductor has been submerged into the medium.

The known filling level determination apparatus has the drawback that respectively only one filling level can be determined that is dictated by the respective position of the tip of the light wave conductor in the container; therefore, it is furthermore proposed in DE 32 35 591 C2 to integrate into the described apparatus a further section of a light wave conductor having a tip that is correspondingly disposed in a different position, so that at least a second filling level can be detected. Further filling heights are respectively possible only by means of a multiplicity of corresponding light wave conductor arrangements. Thus, with the known filling level determination apparatus it is not possible to have a continuous filling level determination over the entire height of the container.

It is therefore an object of the present invention to provide a filling level determination apparatus that is based on the principle of fiberoptic filling level determination, and that enables a continuous determination of a filling level value.

SUMMARY OF THE INVENTION

The realization of this object, including advantageous embodiments and further developments of the invention, is derived from the content of the patent claims that follow this description.

The basic concept of the invention is that the light wave conductor is disposed in the interior of the container, whereby an input section of the light wave conductor that is connected to the light source is guided in the container, in a helical path, to the deepest level of the container that is accessible for the filling level determination, and from here is guided out of the container as a linear output section, and that associated with the input section and the output section, externally of the container, is a respective device for measuring the intensity (I) of the introduced and the exiting light, and the ratio of the intensity measured by the devices ($I_{output}/I_{input}$) can be represented in a filling level value. The invention has the advantage that due to the light wave conductor, which is disposed in the container and therefore is wetted to a different extent as a function of different filling levels of the medium, it is possible to have a continuous measurement of the respective filling level over the entire available filling height of the container, and in particular using the same physical principle without an alteration of the measurement arrangement. Due to the helical path of the light wave conductor in the container, the length of the light wave conductor that can be wetted is increased, so that due to the exiting of light in the portion of the light wave conductor that is wetted by the medium, the precision of the measurement result is increased.

Since the exiting of light out of the wetted portion of the light wave conductor is a function not only of the material and construction of the light wave conductor, but also of the optical characteristics of the medium, which can additionally change with a change in temperature, it is proposed pursuant to an embodiment of the invention, in order to increase the precision of the determination of a filling level value, to provide, in the region of the change in direction from input section to output section of the light wave conductor, a second light wave conductor arrangement that is provided with a winding unit having a defined length, and that is constantly immersed in the medium, and to associate with the input section that is connected to a light source, and to the output section of the second light wave conductor, devices for measuring the intensity (I) of the introduced and of the exiting light; in a following evaluation unit, a normalized intensity loss of the light wave conductor used per unit of length is determined for the medium disposed in the container and is taken into account as a correction factor (K) during the conversion of the intensity ratio ($I_{output}/I_{input}$) into the filling level value. By means of the second light wave conductor arrangement it is thus possible, parallel to the operation of the first light wave conductor arrangement and due to the complete wetting of the second light wave conductor arrangement by the respective medium, and knowing exactly the wetted length, to determine a normalized, length-dependent intensity loss that, independently of the concrete filling level or of the length of the wetted portion of the first light wave conductor, can be used as a correction value (K) for the conversion of the intensity ratio ($I_{output}/I_{input}$) into the filling level value.

Pursuant to an embodiment of the invention, the input section of the light wave conductor is wound onto the outer side of a carrier member that is disposed in the container, and the output section of the light wave conductor is guided out of the container through the carrier member. Pursuant to one embodiment of the invention, the carrier member is formed of an opaque material in order to avoid negative influences upon the precision of measurement.

It can be provided that the pitch of the helical windings of the input section of the light wave conductor varies over the height of the container, whereby the differing pitches of the helical windings are designed for irregular container geometries; in particular in the regions of the container having a greater dimension, it is provided that the pitch of the windings of the input section of the light wave conductor be reduced.

Whereas it is adequate for realizing the invention to utilize the respective light wave conductors without a special sheathing, it is also possible, pursuant to an embodiment of the invention, to provide the light wave conductor with a light-transmitting sheathing.

To increase the precision of measurement, it is possible to establish the wavelength of the light that is introduced into the respective input section in conformity with the color of the transparent liquid medium.

It is provided that the overall energy of the introduced light be limited to 20 μJ.

The arrangement can be simplified by storing filling height-volume tables in a following computer or other computing unit, and the filling level value, which is determined as a filling height, can be corrected as a function of the container geometry, so that different tank or container geometries are corrected for via appropriate correction calculations.

Pursuant to a further development of the invention, it is possible, in a following computing unit, to store information about the density of the medium that is subjected to the filling level measurement, and as a function of the filling level value that is determined, the amount of medium disposed in the container can be determined.

BRIEF DESCRIPTION OF THE DRAWINGS

Embodiments of the invention, which will be described subsequently, are shown in the drawings, in which.

DESCRIPTION OF SPECIFIC EMBODIMENTS

Figure 1:
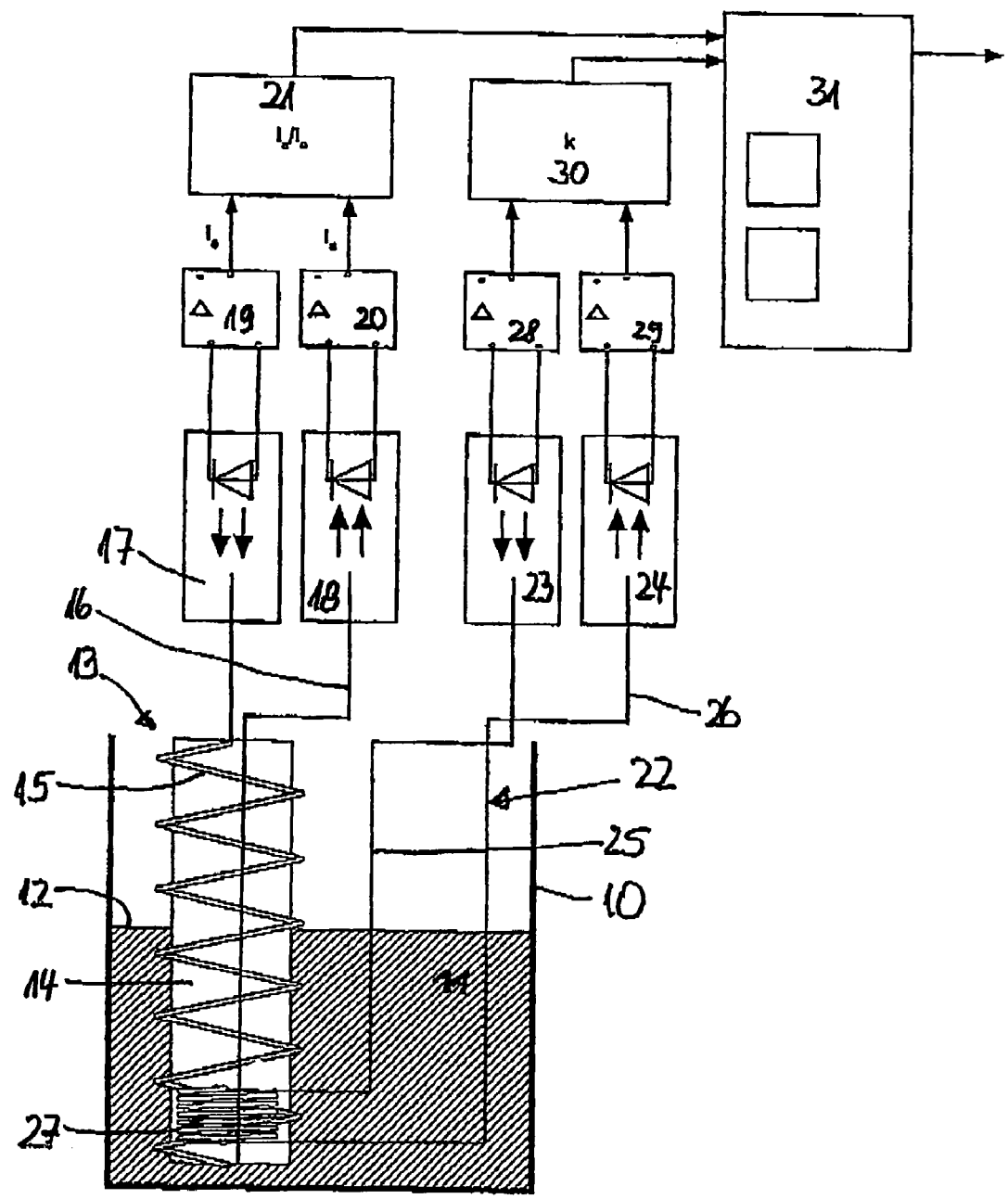
FIG. 1 is a schematic illustration showing the construction of a fiberoptic filling level determination apparatus.

As shown in FIG. 1, a transparent liquid medium 11 is stored in a container 10, and forms a filling level line 12 in the container 10.

A light wave conductor 13 is introduced into the container 10 from a light source 17 that is disposed externally of the container 10, and in particular via an input section 15 that, with a helical path, is wound about the outer periphery of a carrier member 14 that is suspended in the container 10; at the lower end of the carrier member 14, at the deepest level of the container 10 accessible to the filling level measurement, the light wave conductor is guided or redirected into an output section 16 that extends linearly through the carrier member 14, which is preferably made of an opaque material, and is guided out of the container 10. The output section 16 of the light wave conductor 13 terminates at a receiver 18.

Not only the light source 17 but also the receiver 18 have associated with them a respective intensity measuring device 19 and 20 respectively in which the intensity of the introduced light $I_{input}$ on the one hand, and the intensity of the exiting light $I_{output}$ received by the receiver 18, are measured. The corresponding signals are conveyed to an evaluation unit 21 in which the ratio $I_{output}/I_{input}$ is determined.

In addition, a second light wave conductor 22 is provided that, from a light source 23, is guided, via an input section 25, into the container 10, and is shaped into a winding unit 27, which comprises helically disposed windings, and is subsequently returned, as an output section 26, to a receiver 24 that is disposed externally of the container. The winding unit 27 is disposed in the region of the deepest level of the container 10 that is accessible for the filling level measurement in such a way that the winding unit 27 is constantly immersed in the medium 11, whereby its wetted length is exactly prescribed.

In a corresponding manner, respective intensity measuring devices 28 and 29 are associated with the light source 23 and the receiver 24, whereby the respective intensity difference is converted in a subsequent evaluation unit 30 into a correction factor K that is a normalized, length-dependent intensity loss factor via which the intensity ratio $I_{output}/I_{input}$ determined in the evaluation unit 21 is corrected. To this extent, the evaluation unit 21 and the evaluation unit 30 are connected to a computer or other computing unit 31 in which a filling level value (a) in the form of the filling height pursuant to the filling level line 12 is determined according to the equation:

It is furthermore possible to store height-volume tables for various geometries of the container (10) in the following computing unit 31, so that a correction of the calculated filling level value is possible as a function of different container or tank geometries.

It is furthermore possible to expand the computing unit 31 with a data bank having media information relating to the density of the liquid, transparent medium 11 present in the container 10, and to also use the correction factor K for determining the density of the medium 11, so that it is possible to determine the volume or quantity of the medium 11 contained in the container 10.

Figure 2:
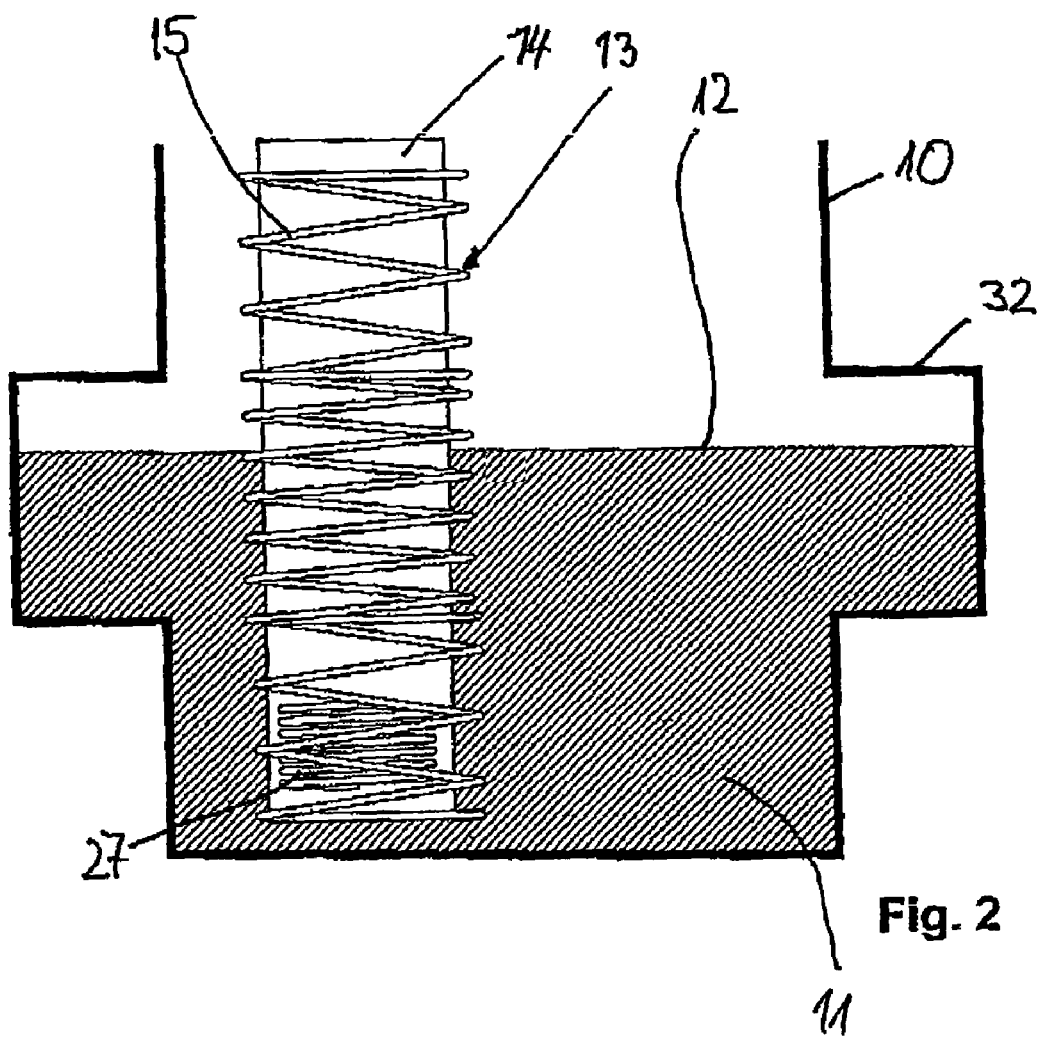
FIG. 2 shows another embodiment of the container and light wave conductor arrangements disposed therein.

FIG. 2 illustrates an embodiment where the container 10 is provided with a widened portion 32, and this non symmetrical container geometry is taken into account with the embodiment of FIG. 2 in that in the region of the widened portion 32, the pitch of the helical windings of the light wave conductor 13 that extend about the carrier member 14 is reduced.

The features of the subject matter of these documents disclosed in the preceding description, the patent claims, the abstract and the drawings can be important individually as well as in any desired combination with one another for realizing the various embodiments of the invention.

The specification incorporates by reference the disclosure of German priority document 101 103 54 041.5 filed Nov. 19, 2003.

The present invention is, of course, in no way restricted to the specific disclosure of the specification and drawings, but also encompasses any modifications within the scope of the appended claims.

The invention claimed is:

1. A fiber optic filling level determination apparatus for liquid transparent medium disposed in a container, comprising:

a light wave conductor disposed within said container and adapted to be immersible at least partially in said medium, wherein said light wave conductor is connected to a light source disposed externally of said container, wherein a difference in intensity between introduced light and exiting light is used to determine the filling level of said medium in said container, wherein said light wave conductor has an input section that is connected to said light source and is guided in said container, in a helical path, to a deepest level of said container that is accessible for said filling level determination, and wherein, proceeding from said input section, said light wave conductor has a linear output section that is guided out of said container along a length of the helical path of the input section;

a first intensity measuring device, for measuring the intensity of introduced light, associated with said input section externally of said container; and a second intensity measuring device, for measuring the intensity of exiting light, associated with said output section externally of said container, wherein a ratio of the intensities measured by said first and second intensity measuring devices is to be represented in a filling level value.

2. A filling level determination apparatus according to claim 1, wherein a further light wave conductor arrangement is provided in the region of a change in direction from said input section to said output section of said light wave conductor, wherein said further light wave conductor arrangement is provided with a winding unit having a defined length, wherein said further light wave conductor arrangement is continuously immersed in said medium and includes a further, input section that is connected to a further light source and a further output section, wherein third and fourth intensity measuring devices, for measuring the intensity of introduced light and exiting light, are associated with said further input section and said further output section respectively, wherein an evaluation unit that follows said light wave conductor arrangement is provided, and wherein in said evaluation unit a standardized intensity loss of said light wave conductor and said further light wave conductor arrangement is determined per unit of length for said medium disposed in said container and is taken into account as a correction factor during the conversion of said intensity ratio into the filling level value.

3. A filling level determination apparatus according to claim 1, wherein a carrier member is disposed in said container, wherein said input section of said light wave conductor is wound onto an outer side of said carrier member and wherein said output section of said light wave conductor is guided out of said container through said carrier member.

4. A filling level determination apparatus according to claim 3, wherein said carrier member is comprised of an opaque material.

5. A filling level determination apparatus according to claim 1, wherein a pitch of helical windings of said input section of said light wave conductor varies over the height of said container.

6. A filling level determination apparatus according to claim 5, wherein varying pitches of said helical windings of said input section of said light wave conductor are designed for irregular container geometries.

7. A filling level determination apparatus according to claim 6, wherein in regions of said container having a greater dimension, the pitch of said helical windings of said input section of said light wave conductor is reduced.

8. A filling level determination apparatus according to claim 1, wherein said light wave conductor is provided with a light-transmitting sheathing.

9. A filling level determination apparatus according to claim 1, wherein a wavelength of light introduced into said input section is established in conformity with a color of said liquid transparent medium.

10. A filling level determination apparatus according to claim 1, wherein an overall energy of the introduced light is limited to 20 µJ.

11. A filling level determination apparatus according to claim 1, wherein a computing unit that follows said light wave conductor is provided, wherein filling height-volume tables are stored in said computing unit, and wherein said filling level value, which is determined as a filling height, can be corrected as a function of container geometry.

12. A filling level determination apparatus according to claim 1, wherein a computing unit that follows is provided, wherein information about the density of said medium that is subjected to said filling level determination is stored in said computing unit, and wherein as a function of said determined filling level value, the amount of said medium in said container can be determined.

* * * * *